United States Patent [19]

Moore

[11] 4,425,175

[45] Jan. 10, 1984

[54] METHOD FOR CONTINUOUSLY PRODUCING A FLEXIBLE DRYWALL JOINT FILLER

[76] Inventor: Dan B. Moore, P.O. Box 1060, Huntington, W. Va. 25701

[21] Appl. No.: 367,669

[22] Filed: Apr. 12, 1982

[51] Int. Cl.³ .............................................. B32B 31/00
[52] U.S. Cl. .................................... 156/229; 156/249; 156/324; 264/148; 264/177 R; 264/210.1; 264/210.2; 428/40; 428/61
[58] Field of Search ................... 156/242, 243, 244.19, 156/229, 249, 344, 71, 324, 244.11, 244.25; 264/148, 177 R, 210.1, 210.2, 210.3; 428/40, 351, 61

[56] References Cited

U.S. PATENT DOCUMENTS

| | | | |
|---|---|---|---|
| 3,576,091 | 4/1971 | Shuli | 428/61 |
| 3,894,904 | 7/1975 | Cook | 264/210.2 |
| 4,151,245 | 4/1979 | Suzuki | 264/210.2 |
| 4,157,271 | 6/1979 | Moore | 156/304.1 |
| 4,220,490 | 9/1980 | Carlson | 156/324 |
| 4,230,753 | 10/1980 | Sheyon | 428/40 |

OTHER PUBLICATIONS

Jacob Lichman, "Water-Based & Solvent-Based Adhesives" Handbook of Adhesives, 2nd Ed., Skeist, Van Nostrand Reinhold Company, pp. 679-681, 1977.

*Primary Examiner*—David A. Simmons
*Assistant Examiner*—Timothy W. Heitbrink
*Attorney, Agent, or Firm*—Cushman, Darby & Cushman

[57] ABSTRACT

A method of continuously producing a flexible drywall joint filler having a central spline portion adapted for cooperation with a joint defined between a pair of adjacent sidewall panels and a pair of substantially thin edge portions, comprises extruding at a predetermined extrusion rate a continuous strip of flexible material having a predetermined width, pulling the extruded pre-formed strip of flexible material at a pulling rate greater than the extrusion rate thereby completely forming the thin edge portions on the strip and reducing the predetermined width by about 30-65% to a completed width, and cooling the material at the completed width to form a continuous strip of flexible drywall joint filler having "feathered" edge portions.

27 Claims, 3 Drawing Figures

METHOD FOR CONTINUOUSLY PRODUCING A FLEXIBLE DRYWALL JOINT FILLER

BACKGROUND AND SUMMARY OF THE INVENTION

The present invention relates to a novel method of continuously producing a flexible drywall joint filler of the type having a central spline portion adapted for cooperation with a joint defined between a pair of adjacent drywall panels. The drywall joint filler includes a pair of edge portions which are "feathered" or substantially thin in cross-section so that a relatively smooth surface with each exposed face of the adjacent drywall panels can be formed.

The construction industry conventionally uses drywall panels due to their relative inexpensiveness for forming durable interior walls. However, before an interior wall can be finished, (e.g. by paint, wallpaper or the like), the joints or gaps between adjacent drywall panels must be filled to provide a substantially smooth, monolithic appearance. Otherwise, the unfilled joints would present an unsightly appearance on the finished walls.

Conventional drywall panels are normally slightly tapered at the edges to facilitate the joint filling process. When adjacent drywall panels are installed, the tapered edges of each form a "v-joint" which must be filled prior to finishing the interior walls.

A prior method of filling drywall v-joints typically comprises applying an amount of joint paste compound in the v-joint and, subsequently, applying a tape, such as, an absorbent paper tape or the like over the paste compound. An additional amount of paste compound is then normally applied over the tape while it is still moist from the underlying application of paste compound and the joint is roughly smoothed with a trowel or similar tool. The paste compound is allowed to dry for a substantial period of time, for example, at least 12 hours, or overnight, and then sanded to remove high spots so that a substantially smooth finish can be provided. However, as the paste compound and absorbent tape dry, they contract thereby necessitating subsequent applications of paste compound over the tape.

Thus, as many as three or four applications of paste compound interspersed with the necessary drying time and sanding are necessary to effectuate a substantially smooth finished surface. It can therefore be appreciated that the total time for providing finished interior walls can take several days. Thus, while the drywall panels are relatively easily nailed in place, the filling of the v-joints between adjacent drywall panels is time consuming. When consideration is given to labor costs, it can be appreciated that a substantial cost is incurred by utilizing the previous method of filling drywall panel v-joints. Additionally, the prior method may be too involved for the novice thereby precluding "do-it-yourself" construction/remodeling.

However, in U.S. Pat. No. 4,157,271 (the entire disclosure of which is incorporated herein by reference), there is disclosed a flexible drywall joint filler which greatly reduces the time and effort necessary for filling joints between adjacent drywall panels. An important feature of the drywall joint filler of U.S. Pat. No. 4,157,271 is the provision of a central spline portion to cooperate with the joint defined between adjacent drywall panels. The joint filler edge portions produced according to the present invention are "feathered" or substantially thin so that when the drywall joint filler is properly installed, a substantially smooth, monolithic surface is almost instantly realized. At most, only a minimal application of paste compound is necessary to effect the desired finished appearance.

A problem has been encountered, however, in that up until the present novel method, the feathered edges of the drywall joint filler exemplified by U.S. Pat. No. 4,157,271 were practically impossible to easily and continuously produce in a commercially viable form. Thus, while a drywall joint filler has been proposed in the art to alleviate the problems associated with conventional methods of filling drywall joints, until this invention, a successful and novel method of producing such joint fillers and, particularly the feathered edges thereof, is believed to have escaped those in the art.

According to the present invention, there is provided a novel method whereby a drywall joint filler having substantially thin, "feathered" edge portions can be continuously produced. The method according to the present invention contemplates that a thermoplastic material is pre-formed by extruding it in a molten state at a predetermined extrusion rate into a continuous strip having a predetermined extrusion width. Thereafter, the continuous strip is pulled by suitable means at a rate higher than the extrusion rate thereby reducing the extrusion width between about 30–65%. In such a manner, the pre-formed strip of drywall filler which was initially extruded is pulled so that the edge portions are "feathered" to produce the desired drywall joint filler.

The strip of drywall joint filler thus extruded is cooled at its reduced width, and thereafter, can be further processed downstream. For example, the continuous strip of drywall joint filler can be applied with an adhesive and, subsequently, have a flexible backing material applied thereto so that undesirable bonding of the joint filler will be precluded. The joint filler can then be cut into predetermined lengths, packaged, and distributed to the market in any convenient or acceptable manner.

The flexible backing material utilized to prevent undesired bonding of the joint filler strips is preferably a sheet of silicone treated paper. Thus, when it is desired to install the drywall joint filler, one need only remove the protective backing material and place the joint filler in the proper location in the v-joint. The raised central spline portion of the joint filler can be utilized to find the joint or a gap defined between adjacent drywall panels and, thereafter, the edges pressed onto the drywall panels to adhesively bond the joint filler thereto.

Other aspects and advantages of the present invention will become more clear after careful consideration of the following detailed description of the preferred exemplary embodiment.

BRIEF DESCRIPTION OF THE DRAWINGS

FIG. 3 is a cross-sectional view of a drywall joint filler which may be produced according to the process of the present invention.

DETAILED DESCRIPTION OF THE PREFERRED EXEMPLARY EMBODIMENT

Figure 1:
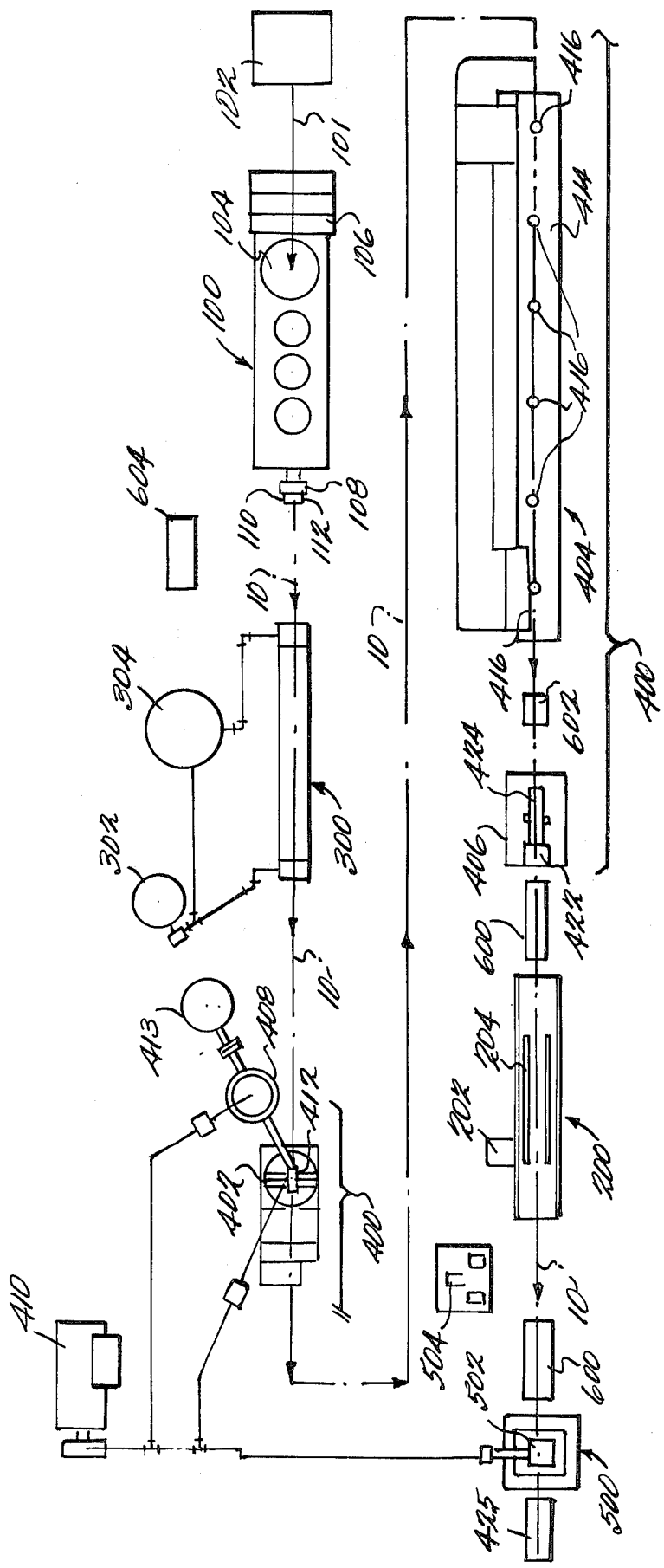
FIG. 1 is a schematic plan view of a preferred exemplary embodiment of the process according to the present invention.

A cross-sectional profile of one type of drywall joint filler 10 which may be produced according to the process of the present invention is generally depicted in FIG. 3. Other cross-sectional profiles of the joint filler can, of course, be advantageously produced. For example, when adjacent drywall panels are positioned so as to form an "outside" corner, the joint filler must be capable of providing a defined edge on the corner. Such an effect is provided by utilizing a joint filler whose edge portions may be folded to form a right angle with respect to one another thereby providing a sturdy, durable "outside" corner. Similarly, when an "inside" corner is formed between adjacent drywall panels or between the top edge of the drywall panels and the ceiling, the joint filler may be extruded so that it can be folded inwardly so as to define an inside edge. Also, a central spline may be provided to find the joint filler between adjacent drywall panels in either the "inside" or "outside" corner arrangement. Thus, while reference will be made to the flat profile of joint filler 10 as shown in FIG. 3 herein, it should be appreciated that other suitable joint filler profiles may be produced according to the present invention. Accordingly, the cross-sectional joint filler profile of FIG. 3 herein should be considered as a non-limiting example of a joint filler which may be advantageously produced by the present novel method.

The joint filler 10 of FIG. 3 comprises a centrally positioned spline portion 12 which preferably extends substantially the entire length of the joint filler. A pair of edge portions 14, 16 are provided which are "feathered" or substantially thin in cross-section to provide a substantially smooth, monolithic surface when the joint filler 10 is properly positioned between adjacent drywall panels. Thus, with the spline 12 properly positioned in the joint 18 formed between adjacent drywall panels 20, 22, a relatively easy, and substantially smooth surface is almost instantly realized due to the feathered edges thereof.

Since the amount of taper of the v-joint varies between drywall manufacturers, it is presently contemplated that a conventional paste compound be applied over joint filler 10. However, use of joint filler 10 will still save a substantial amount of labor since repetitive paste compound applications and drying are eliminated when using the joint filler produced by the present invention.

As used herein, the term "feathered" edge is meant to connote edge portions that are thin enough so that when placed against a relatively smooth surface, the seam between the edge portions and a smooth surface, such as, the face of a drywall panel, is substantially unnoticeable. The "feathered" edge portions of the drywall joint filler produced according to the present invention, for example, may have a thickness of between about 0.0080 to 0.0150 inches, preferably about 0.0095 inches.

Figure 2:
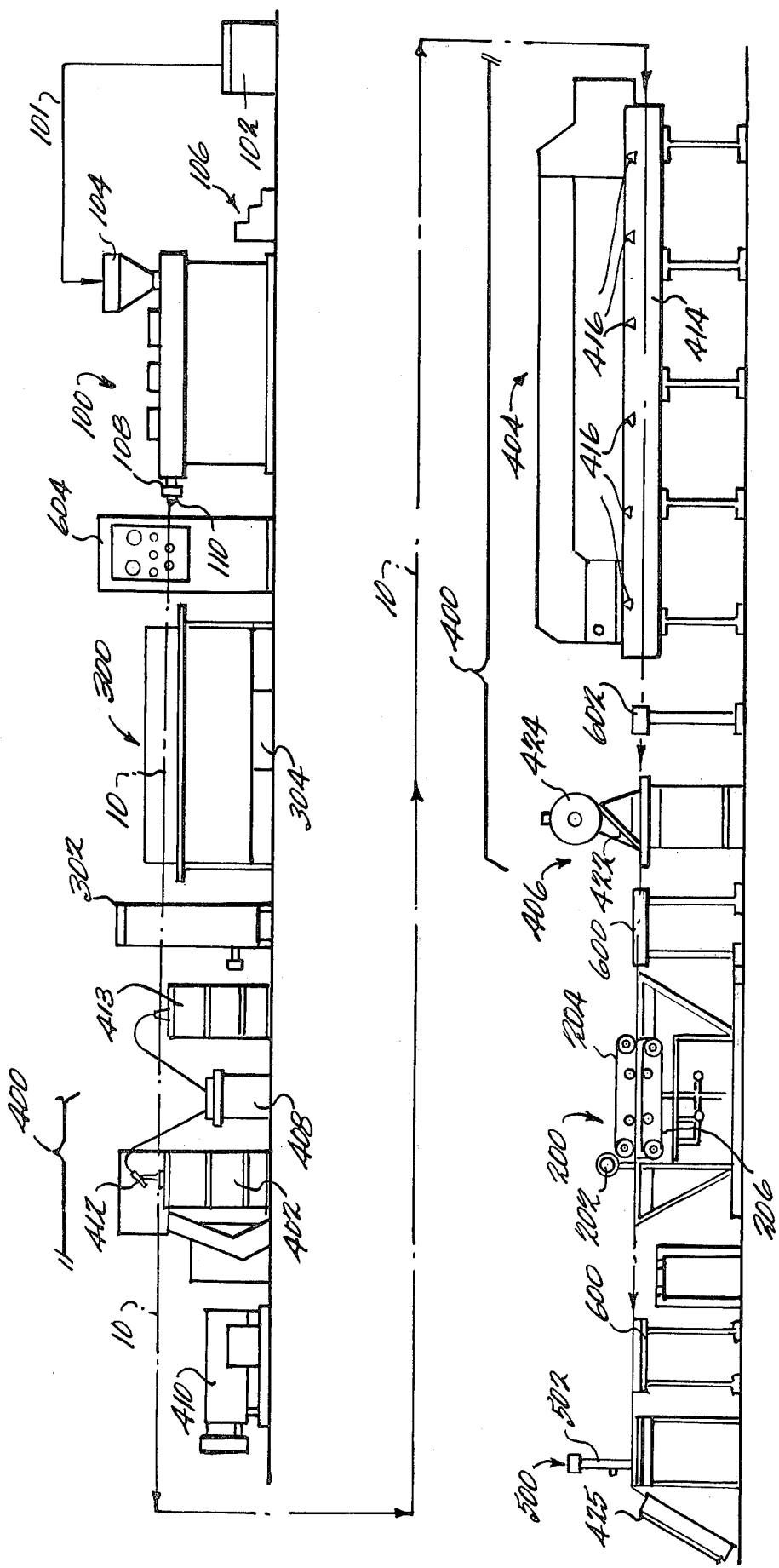
FIG. 2 is a schematic elevational view of the process depicted in FIG. 1.

Referring now to FIGS. 1 and 2 wherein a preferred sequence of process steps according to the present invention is depicted, it will be seen that the process begins at the extruding station 100 wherein raw thermoplastic material (noted by arrow 101) of 80% virgin vinyl and 20% regrind vinyl, or 100% virgin vinyl is transferred from storage 102 and placed into hopper 104 for melting. Steps 106 may be provided for operator convenience in transporting thermoplastic raw material 101 to the extruder 100. Of course, automatic raw material feeding is also contemplated and can be accomplished by any suitable known material handling apparatus.

When the thermoplastic material is melted inside the plasticizing chamber (not shown) of extruder 100, it is transported inside the barrel thereof to the injection point. The molten thermoplastic material inside the extruder passes through a series of small round screens (not shown), for example, 1-20, 1-40 and 2-60 mesh grade screens, and subsequently into the breaker plate 108 which creates back pressure thereon and forces the molten thermoplastic material into die 110. Die 110 of extruder 100 is maintained at an elevated temperature, preferably between about 360° F. to about 370° F., on all four edges with suitable heater plates 112 to properly maintain the extruded thermoplastic material in a molten condition.

The screens are provided to keep impurities out of the molten thermoplastic material which can have the deleterious effect of tearing the molten material or deforming it during the extrusion process.

Die 110 utilized according to the method of the present invention must be capable of adequately pre-forming the extrudate from the extruder 100 so that the final forming thereof can be accomplished as will be more fully discussed below. As the extruded thermoplastic material leaves die 110, it has been generally pre-formed to a width of preferably about 4 inches having the central wedge-shaped spline thereon. Knives (not shown) are utilized on the extruder 100 to ensure uniformity of width of the pre-formed joint filler.

An important aspect of the present invention is the provision for pulling the continuous strip of joint filler 10 after extrusion to produce the "feathered" edges thereof. The puller 200 is provided with a variable speed motor 202 to control the speed at which the opposing belts 204, 206 rotate. Belts 204, 206 are vertically adjustable so that a driven force can always be maintained with the continuous strip of joint filler 10. Puller 200 is operated at a rate greater than the rate of thermoplastic extrusion at extruder 100 to produce a "pulling" effect upon the joint filler strip 10. Pulling rates of between about 40-60 feet per minute, preferably 50 feet per minute can advantageous be utilized. Thus, as puller 200 operates, the pre-formed width of the extrudate at die 110 is preferably reduced by about 40-65% due to the greater rate of operation of the puller 200.

For example, the pre-formed width of the extruded vinyl as it leaves die 110 is preferably about 4 inches and, due to the greater rate of operation of puller 200, is reduced to a final, completed width of between about 1½ inches to about 2½ inches, preferably about 2 inches. The greater rate of operation of puller 200 therefore, in effect, stretches the extrudate pre-formed at extruder 100 to such an extent that the pre-formed width is reduced by about 30-65% to a final product width. This unique feature causes the edges of the extrudate to be "feathered" and, additionally, forms the spline in a proper manner.

As noted above, the pre-formed width of the extruded thermoplastic material is decreased by about 30-65% due to the stretching action of puller 200. Thus, the extrudate must be cooled while it is in such a stretched condition by suitable means to maintain the preferred final product width. According to the present invention, a water bath 300 may be provided for such cooling purposes. The stretched joint filler strip is passed through water bath 300 which is preferably maintained at about 150° F. By controlling the water temperature of bath 300, an equalized cooling of the spline portion and the feathered edges is effected. A hot water heater 302 and a water reservoir 304 are provided to maintain the water in the water bath at the predetermined desired temperature. Sponges (not shown) and/or compressed air are utilized to remove excess water on the cooled strip of joint filler 10 as it exits water bath 300.

The process according to the present invention also contemplates that a pressure-sensitive adhesive can be applied to the spline side of the joint filler strip to promote ease of installation between two adjacent drywall panels. For this purpose, there is provided an adhesive application system 400 which generally comprises an adhesive spray unit 402, a drying section 404, and a release paper applicator 406 in sequence.

The adhesive spray unit 402 utilizes a pressurized adhesive tank 408 in which compressed air is forced by virtue of any suitable compressing means, such as compressor 410, to atomize the adhesive in tank 408. Thereafter, the atomized adhesive is transferred to a spray nozzle 412 directed at the spline side of the joint filler strip. Thus, as the joint filler strip is conveyed under the sprayer, a film of adhesive is coated thereon. Preferably, the adhesive is an acrylic-latex, water-based adhesive, such as, for example, the adhesive manufactured by Union Carbide under the tradename "UCR-173". Such adhesives are soluble in water, yet are relatively viscous. In order to effectively spray the contact adhesive onto the joint filler, the adhesive must be admixed with a sufficient amount of fluid, preferably water, and subsequently transferred from storage tank 413 to the moving strip of joint filler as hereinbefore described.

A drying section 404 is provided subsequent to the adhesive application to dry the adhesive to such an extent that it is capable of bonding when desired. The drying section 404 preferably comprises a tunnel chamber 414 through which the joint filler strip 10 having the adhesive sprayed thereon is conveyed. The atmosphere in chamber 414 is maintained at elevated temperatures by any suitable means. A plurality of heat lamps 416 may be provided in the interior of chamber 414 along the path of conveyance of the joint filler strip 10. Lamps 416 preferably maintain the temperature in chamber 414 at about 240° F. Additionally, air may be forced through tunnel chamber 414 to aid in the removal of excess moisture.

The release paper applicator 406 applies a flexible sheet of removable backing paper, preferably silicone treated paper, to the dried adhesive as it exits the drying section 404. The silicone treated paper, therefore, prevents undesired bonding of the flexible joint filler strip 10 prior to use. When it is desired to install the joint filler strip, one need only remove the backing paper on the adhesive side and, properly install the joint filler as hereinbefore described. The adhesive is such that when pressure is applied to the exterior surface of the joint filler strip, the adhesive securely bonds to the surface in which it is in contact such as, drywall panels. The release paper 422 is preferably maintained above the joint filler strip in a rolled form 424 and, due to the continuous movement of the joint filler strip, is progressively applied to the spline side of the joint filler strip 10.

With the application of the removable backing paper 422, the continuous strip of joint filler can be cut into predetermined lengths and collected in a suitable product collection box 425 for packaging or other subsequent process steps. The cutting assembly 500 according to the present invention can be any suitable controlled means. According to the present invention there may be provided a reciprocal, hydraulically operated cutting assembly 502 utilizing compressed air via compressor 410. A timing sequence is provided and is correlated to the rate of travel of the continuous joint filler strip 10 so that the cutting assembly operates to cut the strip into generally uniform sections of predetermined length. Preferably, lengths of about 4 feet are cut which may have straight or beveled ends. To control the timing sequence of the cutting assembly 500, conventional means, such as impulse relay timer 504 and solenoid valves (not shown) operatively connected thereto may be utilized. Additionally, other state of the art electronic and/or pneumatic controls may be advantageously utilized.

As needed, feed guides 600 can be disposed between various process stations to prevent the joint filler strip from becoming uneven or sagging as it is conveyed between successive process steps. Such feed guides 600 are most preferably comprised of wood and are aligned with the direction of travel of the strip through the processing sequence.

Additionally, a thickness meter 602 may be provided in the process to measure the thickness of the "feathered" edges of the joint filler strip to insure that the product is being produced according to appropriate quality standards. The thickness meter may be interlocked via suitable electronic control devices (not shown) to control the speed of the puller 200 and thereby correct any variations in edge thickness which may be detected. Alternately, the operator may control the speed of puller 200 in response to readings from meter 602 at the extruder 100 by way of remote controls (shown at 604).

While puller 200 has been hereinbefore described as an important feature of the present invention and particularly, the rate at which it is operated, it is presently conceived that the puller operate at a rate of between about 40 to about 60 feet per minute, preferably about 50 feet per minute. However, puller 200 can conceivably be operated at rates above 50 feet per minute, for example, 120 feet per minute, and is dependent upon the rate of extrusion at extruder 100. Thus, for a given extrusion rate at extruder 100, puller 200 may operate at a rate in excess of 50 feet per minute to provide the "feathered" edges of the joint filler strip.

Additionally, while puller 200 is shown in the drawings as located downstream of the drying section 400, it should be realized that puller 200 can be located at any point along the process. Thus, puller 200 can be located anywhere downstream of extruder 100. Of course, when consideration is given to the fact that puller 200 may be the only driven force for conveying the strip through the various process steps, it will be appreciated that the preferred location of puller 200 is downstream of the release paper applicator. However, puller 200 can be located immediately downstream of the extruder but upstream of the water bath, for example, and other suitable driven means can be additionally utilized to adequately convey the joint filler strip through the various processing steps.

While the above invention has been herein described as what is presently conceived to be the most preferred embodiment thereof, it will be appreciated by those in the art that many modifications can be made thereof after a careful reading of the above disclosure, which modifications should be accorded the broadest scope of the appended claims so as to encompass all equivalent processes and methods.

What is claimed is:

1. A method of continuously producing a flexible drywall joint filler having a raised central spline portion adapted for cooperation with a joint defined between a pair of adjacent drywall panels and a pair of substantially thin edge portions extending the entire length of the joint filler, the method comprising the steps of:
   (a) extruding at a predetermined extrusion rate a continuous strip of flexible drywall joint filler having a predetermined width to pre-form the raised central spline portion and said edge portions;
   (b) pulling the strip of flexible joint filler at a pulling rate greater than the extrusion rate to axially stretch the pre-formed strip to completely form the substantially thin edge portions and central spline portion and to reduce said predetermined width to a completed width; and
   (c) cooling the strip to maintain the completed width.

2. A method as in claim 1 further comprising the step of:
   (d) cutting the continuous flexible strip into predetermined lengths.

3. A method as in claims 1 or 2 wherein step (b) is practiced at a pulling rate of between about 40 to about 50 feet per minute.

4. A method as in claims 1 or 2 wherein step (b) is practiced at a pulling rate of about 50 feet per minute.

5. A method as in claims 1 or 2 wherein step (b) is practiced at a pulling rate of at least 50 feet per minute.

6. A method as in claim 1 wherein said predetermined width is about 4 inches and said completed width is between about 1½ inches to about 2½ inches.

7. A method as in claim 6 wherein said completed width is about 2 inches.

8. A method as in claims 1 or 6 wherein step (b) is practiced so as to form the edge portions at a thickness between about 0.0080 inches to about 0.0150 inches.

9. A method as in claim 8 wherein the edge portions are about 0.0095 inches thick.

10. A method as in claims 1 or 2 further comprising after step (a), the steps of:
    (i) applying a pressure sensitive adhesive to one side of the flexible strip; and
    (ii) covering the side of the flexible strip having adhesive applied according to step (i) with removable backing material.

11. A method as in claim 10 wherein the removable backing material is silicone treated paper.

12. A method as in claim 10 wherein step (i) is practiced by spraying liquid adhesive onto the flexible strip.

13. A method as in claim 11 wherein the liquid adhesive is water-based and prior to step (ii) there is practiced the step of removing excess water from the liquid adhesive.

14. A method as in claim 13 wherein removing excess water from the adhesive is practiced by
    (1) passing the flexible strip having adhesive applied according to step (i) through a heated chamber; and
    (2) forcing air through the chamber to remove excess water in the adhesive.

15. A method as in claim 14 wherein the chamber is heated to about 240° F.

16. A method as in claim 1 wherein step (c) is practiced by passing the material through a liquid bath and controlling the temperature of the liquid bath to effect equalized cooling of the central portion and edge portions.

17. A method of continuously producing a flexible drywall joint filler having a raised central spline portion adapted for cooperation with a joint defined between a pair of adjacent drywall panels and a pair of substantially thin edge portions extending the entire length of the joint filler for forming a substantially smooth surface with each exposed face of the drywall panels, the method comprising the steps of:
    (a) extruding at a predetermined extrusion rate a continuous strip of molten flexible material at a predetermined extrusion width to pre-form the raised central spline and edge portions;
    (b) pulling the material extruded according to step (a) at a pulling rate greater than the extrusion rate to axially stretch the pre-formed strip to reduce the extrusion width by about 30–65% to a final width;
    (c) cooling the flexible strip material by passing the strip having said final width through a liquid bath and controlling the temperature of the bath to effect equalized cooling of the central portion and edge portions;
    (d) applying a pressure-sensitive adhesive to the side of the flexible strip having the central portion formed thereon;
    (e) covering said side having adhesive applied according to step (d) with a removable flexible backing material to prevent bonding of the flexible strip prior to use; and
    (f) cutting the flexible strip into predetermined lengths.

18. A method as in claim 17 wherein step (b) is practiced by reducing the extrusion width of about 4 inches to a final width of between about 1½ inches to about 2½ inches.

19. A method as in claim 18 wherein step (b) is practiced at a pulling rate of at least 50 feet per minute.

20. A method as in claim 19 wherein said completed width is about 2 inches.

21. A method as in claims 17 or 18 wherein step (b) is practiced so as to form the edge portions at a thickness between about 0.0080 inches to about 0.0150 inches.

22. A method as in claim 21 wherein the edge portions are about 0.0095 inches thick.

23. A method as in claim 17 wherein step (c) is practiced at a temperature of about 150° F.

24. A method as in claim 17 wherein step (a) is practiced at a temperature between about 360° F. to about 370° F.

25. A method as in claims 17 or 18 wherein step (d) is practiced by the steps of:
    (i) spraying a water-based adhesive onto said one side; and
    (ii) removing excess water from the water-based adhesive applied according to step (i).

26. A method as in claim 25 wherein step (ii) is practiced by passing the flexible strip through a heated chamber and forcing air through the chamber to remove excess water in the adhesive.

27. A method as in claim 26 wherein the chamber is heated to about 240° F.

* * * * *